US011900051B2

(12) United States Patent
Sunaga et al.

(10) Patent No.: US 11,900,051 B2
(45) Date of Patent: Feb. 13, 2024

(54) DATA PROCESSING DEVICE, DATA PROCESSING METHOD, AND DATA PROCESSING PROGRAM

(71) Applicant: Nippon Telegraph and Telephone Corporation, Tokyo (JP)

(72) Inventors: Satoshi Sunaga, Musashino (JP); Koji Hoshino, Musashino (JP); Kazuhiro Kikuma, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 78 days.

(21) Appl. No.: 17/622,007

(22) PCT Filed: Jun. 24, 2019

(86) PCT No.: PCT/JP2019/025001
§ 371 (c)(1),
(2) Date: Dec. 22, 2021

(87) PCT Pub. No.: WO2020/261344
PCT Pub. Date: Dec. 30, 2020

(65) Prior Publication Data
US 2022/0245334 A1 Aug. 4, 2022

(51) Int. Cl.
*G06F 17/00* (2019.01)
*G06F 40/18* (2020.01)
*G06N 20/00* (2019.01)
*G06F 40/279* (2020.01)

(52) U.S. Cl.
CPC ............ *G06F 40/18* (2020.01); *G06F 40/279* (2020.01); *G06N 20/00* (2019.01)

(58) Field of Classification Search
CPC ...... G06F 40/18; G06F 40/279; G06F 16/242; G06N 20/00

USPC ....................................................... 715/212
See application file for complete search history.

(56) References Cited

U.S. PATENT DOCUMENTS

2005/0160360 A1\* 7/2005 Nadamoto ............ G06F 16/954
715/264
2018/0096060 A1\* 4/2018 Peled ...................... G06F 16/35

FOREIGN PATENT DOCUMENTS

JP   H09297766   11/1997

OTHER PUBLICATIONS

Heng, Table-to-Text Generation with Effective Hierarchical Encoder on Three Dimensions (Row, Column, and Time), Proceedings of the 2019 Conference on Emprical Methods in Natural Language Processing and the 9th International Joint Conference on Natural Language Processing, 2019 (Year: 2019).\*
Sunaga et al., "A Method of Verification Necessity Determination using Support Vector Machine," IEICE Technical Report, Nov. 2018, 13 pages.

\* cited by examiner

*Primary Examiner* — Stephen S Hong
*Assistant Examiner* — Matthew J Ludwig
(74) *Attorney, Agent, or Firm* — Fish & Richardson P.C.

(57) ABSTRACT

A data processing device (10) includes a vector generation unit (1411, 1421) configured to obtain a number of appearance or a frequency of appearance of a word used in a caption of a row of a cell and in a caption of a column of the cell at which the row and the column of table data intersect with each other and generate a vector which has the obtained number of appearance or the obtained frequency of appearance as a value of an element.

6 Claims, 12 Drawing Sheets

Fig. 3

| | PURPOSES AND VIEWPOINTS OF TRAVEL / COMMENTS ON SIGHTSEEING SPOT | A<br>SCENIC LOCATION. BEAUTIFUL AUTUMN LEAVES. STREETSCAPE WITH A RETRO FEEL. | B<br>CAN ENJOY SPORTS. CYCLING, FISHING, TENNIS, ALSO HORSE RIDING. | C<br>NICE MEAL. WEALTH OF FOODS. FOODS FROM THE SEA, FOODS FROM MOUNTAIN, GOURMET. | D<br>⋮ |
|---|---|---|---|---|---|
| 1 | EXQUISITE LOCAL BRAND BEEF. REASONABLE PRICE. FURTHER, THIS SPOT HAS REMAINS OF BUILDINGS IN MEIJI ERA, WHICH IS RECOMMENDED FOR PEOPLE WHO LIKE HISTORY. | ○ | — | ○ | ⋮ |
| 2 | CHERRY BLOSSOM IN EARLY SPRING IS THE MAIN TOURIST ATTRACTION. IT TAKES ABOUT ONE HOUR BY BUS FROM STATION, BUT WORTH SEEING. EASY TO ACCESS BY CAR. | ○ | — | — | ⋮ |
| 3 | FACILITY HAS TWO TENNIS COURTS WHICH CAN BE USED AT NO FEE. ABOUT 10-MINUTE DRIVE TO GOLF COURSE. THERE IS NO CONVENIENCE STORE IN THE NEIGHBORHOOD, AND SO YOU NEED TO GO TO TOWN FOR SHOPPING. | — | ○ | — | ⋮ |
| 4 | | ⋮ | ⋮ | ⋮ | ⋮ |

Fig. 4

|  |  | WORD AND THE NUMBER OF APPEARANCE OF WORD | | | | |
|---|---|---|---|---|---|---|
|  |  | LOCAL (WORD 1) | BRAND (WORD 2) | BEEF (WORD 3) | ... | STREETSCAPE (WORD n) |
| F1A | 1A | 1 | 1 | 1 | ... | 1 |
|  | 1B | 1 | 1 | 1 | ... | 0 |
|  | 1C | 1 | 1 | 1 | ... | 0 |
|  | ... | ... | ... | ... | ... | ... |
|  | 2A | 0 | 0 | 0 | ... | 0 |
|  | ... | ... | ... | ... | ... | ... |

[ VECTOR 1A] +1 1:1 2:1 3:1 4:0 5:0 6:1···
[ VECTOR 1B] −1 1:1 2:1 3:1 4:3 5:1 6:0···
[ VECTOR 1C] +1 1:1 2:1 3:1 4:1 5:0 6:0···

Fig. 6

[ VECTOR 11A] −1 1:0 2:1 3:0 4:1 5:0 6:1···
[ VECTOR 11B] −1 1:1 2:0 3:1 4:1 5:1 6:0···
[ VECTOR 11C] −1 1:0 2:0 3:0 4:1 5:0 6:0···

Fig. 7

| | VIEWPOINTS OF VERIFICATION | A | B | C | D |
|---|---|---|---|---|---|
| FUNCTIONAL REQUIREMENT DESCRIPTION | | CHANGE OF DATA | COMMAND INPUT. MESSAGE OUTPUT. | SERVER REBOOT | ... |
| 1 | CLEAR DATA OF RESPECTIVE TRAFFIC COLLECTION ITEMS UPON SERVICE START IN NEW SYSTEM AND SET NEW CALL AS COUNT TARGET WITHOUT INCLUDING CALL TO BE RESCUED IN COUNT TARGET. | — | O | — | ... |
| 2 | THERE IS POSSIBILITY THAT DATA INPUT ON DB MAY MISMATCH DATA LOADED ON MEMORY, AND THUS, IN A CASE WHERE MAINTENANCE COMMAND FOR TARGET ITEM IS INPUT, RECOVERY PROCEDURE IS PERFORMED. | O | — | — | ... |
| 3 | RESCUE DETERMINATION PROCESSING PERFORMED IN ONE PROCESS IS PERFORMED IN TWO PROCESSES IN DISTRIBUTED MANNER TO ACHIEVE REDUCTION IN RESCUE PROCESSING PERIOD UPON SYSTEM SWITCHING. ITEMS OF RESCUE DETERMINATION PROCESSING ARE NOT PARTICULARLY CHANGED. | — | O | O | ... |
| 4 | ... | ... | ... | ... | ... |

| | WORD AND THE NUMBER OF APPEARANCE OF WORD ||||| T2-2 |
| | TRAFFIC (WORD 1) | COLLECTION (WORD 2) | ITEM (WORD 3) | ... | PREVENTION (WORD n) |
|---|---|---|---|---|---|
| 1A | 1 | 1 | 1 | ... | 0 |
| 1B | 1 | 1 | 1 | ... | 0 |
| 1C | 1 | 1 | 1 | ... | 0 |
| ... | ... | ... | ... | ... | ... |
| 2A | 0 | 0 | 1 | ... | 0 |
| ... | ... | ... | ... | ... | ... |

F1A' points to row 1A.

DATA PROCESSING DEVICE, DATA PROCESSING METHOD, AND DATA PROCESSING PROGRAM

CROSS-REFERENCE TO RELATED APPLICATIONS

This application is a National Stage application under 35 U.S.C. § 371 of International Application No. PCT/JP2019/025001, having an International Filing Date of Jun. 24, 2019, the disclosure of which is considered part of the disclosure of this application, and is incorporated in its entirety into this application.

TECHNICAL FIELD

The present invention relates to a data processing device, a data processing method, and a data processing program.

BACKGROUND ART

When machine learning is used in natural language processing, linguistic expression of a sentence, text and a word can be expressed in an expression which can be easily mathematically handled, for example, a vector, and similarity between vectors can be measured as similarity between documents.

A bag of words (BoW) method for expressing natural language description with vectors has been used in document classification in related art. This method uses the number of appearance of words in a text as elements of a vector and predicts a genre on the basis of training data of the vector and a genre to which the text from which the vector is generated belongs.

CITATION LIST

Patent Literature

Patent Literature 1: Japanese Patent Laid-Open No. 09-297766

Non-Patent Literature

Non-Patent Literature 1: Sunaga. et al. "A Method of Verification Necessity Determination using Support Vector Machine", IEICE Technical Report, NS2018-147 (2018-11), (2018)

SUMMARY OF THE INVENTION

Technical Problem

FIG. 14 is a diagram explaining a text genre prediction method using the BoW method in related art. As illustrated in FIG. 14, first, in the method in related art, vectors are generated from the number of appearance of words in texts to be processed (see (1) in FIG. 14). In the method in related art, genres of the texts to be processed are predicted from similar vectors among training data with reference to past training data of the vectors and genres to which the texts from which the vectors are generated belong (see (2) in FIG. 14), and genre prediction results are output (see (3) in FIG. 14).

However, the BoW method in related art cannot be applied to table data which is indicated using a table and which includes captions of respective rows and respective columns, and thus, machine learning and prediction processing cannot be performed. Further, techniques in related art which can handle table data, such as low rank matrix completion, a recommendation system and collaborative filtering have a problem that the techniques cannot handle text described in natural language because features of a document cannot be obtained from a sentence or text described in natural language.

The present invention has been made in view of the above-described circumstances, and an object of the present invention is to provide a data processing device, a data processing method, and a data processing program which enable vectorization of natural language description in table data.

Means for Solving the Problem

To solve the above-described problem and achieve the object, a data processing device according to the present invention includes a generation unit configured to obtain the number of appearance or a frequency of appearance of a word used in a caption of a row of a cell and in a caption of a column of the cell at which the row and the column of table data intersect with each other, and generate a vector which has the obtained number of appearance or the obtained frequency of appearance as a value of an element.

Further, a data processing method according to the present invention is a data processing method to be executed by a data processing device, and includes obtaining a number of appearance or a frequency of appearance of a word used in a caption of a row of a cell and in a caption of a column of the cell at which the row and the column of table data intersect with each other, and generating a vector which has the obtained number of appearance or the obtained frequency of appearance as a value of an element.

Further, a data processing program according to the present invention causes a computer to execute a step of obtaining the number of appearance or a frequency of appearance of a word used in a caption of a row of a cell and in a caption of a column of the cell at which the row and the column of table data intersect with each other, and generating a vector which has the obtained number of appearance or the obtained frequency of appearance as a value of an element.

Effects of the Invention

According to the present invention, it is possible to vectorize natural language description in table data.

BRIEF DESCRIPTION OF DRAWINGS

FIG. 3 is a diagram illustrating an example of a table indicating comments on sightseeing spots and purposes and viewpoints of a travel.

FIG. 4 is a table indicating the counted numbers of appearance of words described in the table indicated in FIG. 3.

FIG. 5 is a diagram illustrating an example of vectors generated by a learning unit illustrated in FIG. 1.

FIG. 6 is a diagram illustrating an example of vectors generated by a prediction unit illustrated in FIG. 1.

FIG. 7 is a diagram illustrating an example of a table indicating whether or not verification is required.

DESCRIPTION OF EMBODIMENTS

Figure 1:
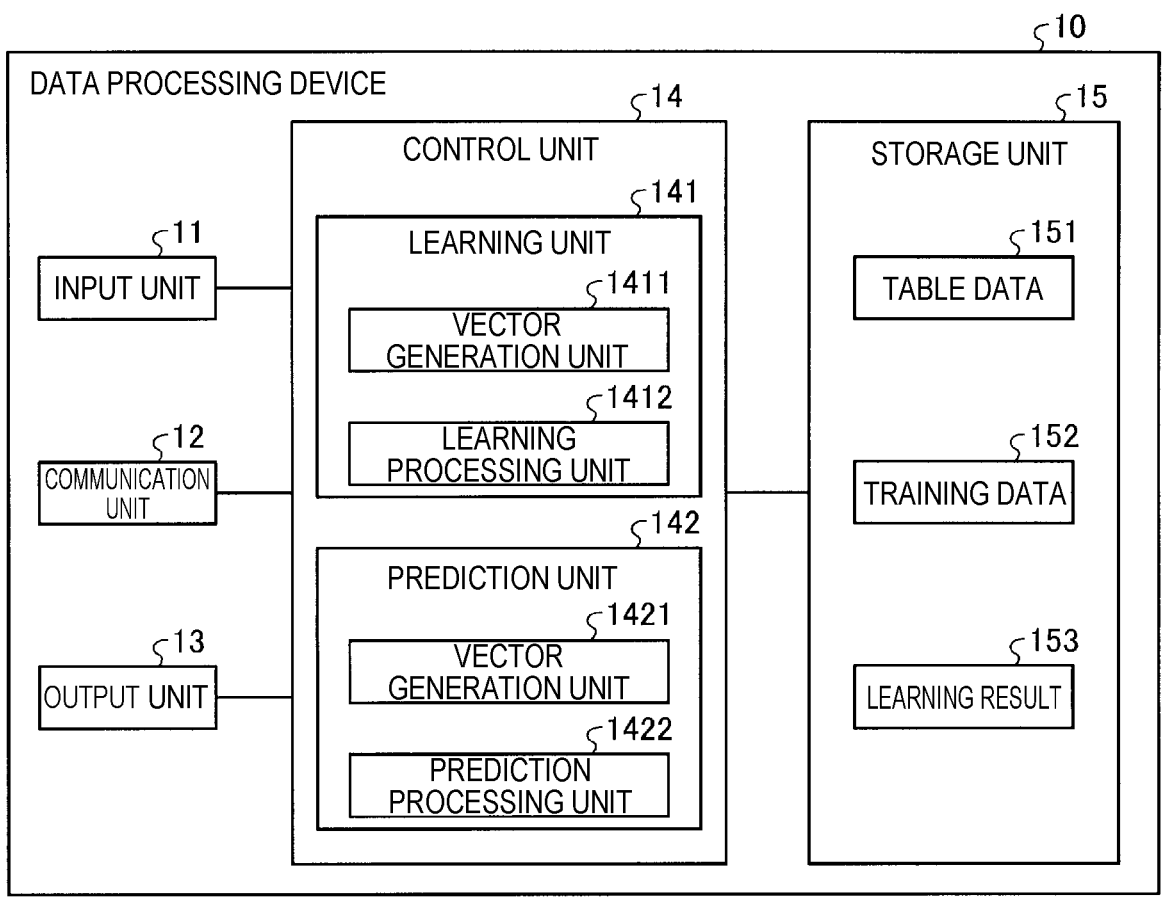
FIG. 1 is a diagram schematically illustrating an example of a configuration of a data processing device according to an embodiment.

An embodiment of the present invention will be described in detail below with reference to the drawings. Note that this embodiment does not limit the present invention. Further, the same reference numerals are assigned to the same portions in description of the drawings.

Embodiment

The embodiment of the present invention will be described. The present embodiment assumes to target computerized text document data (hereinafter, referred to as document data). In the present embodiment, the numbers of appearance of words used in a caption of a row and the numbers of appearance of words used in a caption of a column are combined and set as a feature vector (hereinafter, referred to as a vector) of a cell at which the row intersects with the column. This enables implementation of machine learning and prediction of content on table data in the present embodiment, which could not be performed with the method in related art.

[Configuration of Data Processing Device]

A configuration of a data processing device in the embodiment will be described first. FIG. 1 is a diagram schematically illustrating an example of the configuration of the data processing device according to the embodiment. As illustrated in FIG. 1, the data processing device 10 includes an input unit 11, a communication unit 12, an output unit 13, a control unit 14, and a storage unit 15.

The input unit 11 is an input interface which accepts various kinds of operation from an operator of the data processing device 10. For example, the input unit 11 includes an input device such as a touch panel, a speech input device, a keyboard and a mouse.

The communication unit 12 is a communication interface which transmits/receives various kinds of information to/from other devices connected via a network, or the like. The communication unit 12 is implemented with a network interface card (NIC), or the like, and performs communication between other devices and the control unit 14 (which will be described later) via a telecommunication line such as a local area network (LAN) and the Internet. For example, the communication unit 12 receives data of a document file for which vectors are to be generated via a network and outputs the data to the control unit 14. Here, the document file is table data including rows and columns. The present embodiment will be described using table data which is indicated using a table and which includes combination of captions of rows and columns as a processing target. The table data is stored in the storage unit 15 by the control unit 14. Further, the communication unit 12 outputs information of vectors generated by the control unit 14 to an external device via a network.

The output unit 13 is implemented with, for example, a display device such as a liquid crystal display, a printing device such as a printer, an information communication device, or the like, and outputs a document file to be processed, information indicating the vectors generated by the control unit 14, or the like.

The control unit 14 controls the whole of the data processing device 10. The control unit 14 is, for example, an electronic circuit such as a central processing unit (CPU) and a micro processing unit (MPU), or an integrated circuit such as an application specific integrated circuit (ASIC) and a field programmable gate array (FPGA). Further, the control unit 14 includes an internal memory for storing programs which specify various kinds of processing procedure and control data and executes respective kinds of processing using the internal memory. Further, the control unit 14 functions as various kinds of processing units by various kinds of programs running. The control unit 14 includes a learning unit 141 and a prediction unit 142.

The learning unit 141 includes a vector generation unit 1411 and a learning processing unit 1412.

The vector generation unit 1411 generates a vector for table data for learning. Specifically, the vector generation unit 1411 obtains the numbers of appearance or frequencies of appearance of words used in a caption of a row of a cell and in a caption of a column of the cell at which the row and the column of table data intersect with each other. The vector generation unit 1411 then generates a vector which has the obtained numbers of appearance or the obtained frequencies of appearance as values of elements, as a vector indicating features of the cell.

The vector generation unit 1411 executes the processing for all cells at which rows and columns of the table data intersect with each other to generate vectors indicating features of the cells for each cell. The vector generation unit 1411 then stores the vectors of the respective cells in the storage unit 15 as training data 152. The vector generation unit 1411 may multiply the numbers of appearance or the frequencies of appearance of words by a weight value corresponding to the row of the cell or the column of the cell and may set the multiplied values as the values of the elements of the vector.

The learning processing unit 1412 learns the vectors of the cells generated by the vector generation unit 1411 for the table data for learning and content of the cells for which the vectors are generated among the cells of the table data for learning, using machine learning. The learning processing unit 1412 learns the vectors of the respective cells of the table data for learning and content of the respective cells respectively corresponding to the vectors through machine learning. The learning unit 141 stores a learning result 153 of the learning in the storage unit 15.

The prediction unit 142 includes a vector generation unit 1421 and a prediction processing unit 1422.

The vector generation unit 1421 performs the same processing as that performed by the vector generation unit 1411, on table data to be predicted. The vector generation unit 1421 obtains the numbers of appearance or frequencies of appearance of words used in a caption of a row of a cell and in a caption of a column of the cell at which the row and the column of the table data to be predicted intersect with each other. The vector generation unit 1421 then generates a vector which has the obtained numbers of appearance or the obtained frequencies of appearance as values of elements, as a vector indicating features of the cell. Further, the vector generation unit 1421 may multiply the numbers of appearance or the frequencies of appearance of words by a weight value corresponding to the row of the cell or the column of the cell and may set the multiplied values as the values of the elements of the vector.

The prediction processing unit 1422 predicts content of the cell on the basis of the vector generated by the vector generation unit 1421 and the learning result 153 by the learning unit 141.

The storage unit 15 is a storage device such as a hard disk drive (HDD), a solid state drive (SSD) and an optical disk. Note that the storage unit 15 may be a semiconductor memory such as a random access memory (RAM), a flash memory and a non volatile static random access memory (NVSRAM), which allows rewriting of data. The storage unit 15 stores an operating system (OS) and various kinds of programs to be executed at the data processing device 10. Further, the storage unit 15 stores various kinds of information to be used in execution of the programs. The storage unit 15 stores table data 151 to be processed, training data 152 including the vectors of the respective cells of the table data for learning generated by the vector generation unit 1411, and the learning result 153 of the learning by the learning unit 141.

[Flow of Data Processing]

Figure 2:
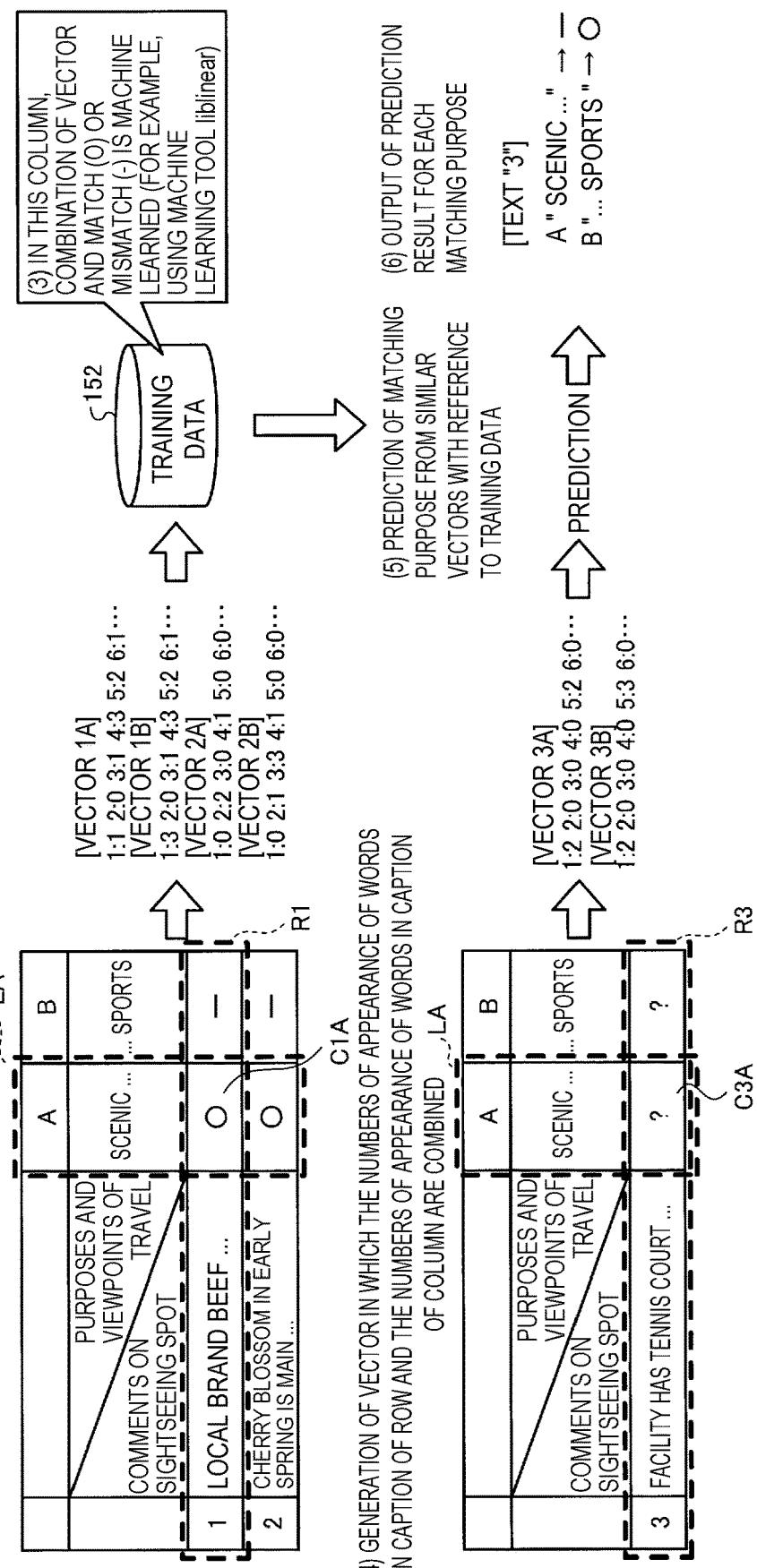
FIG. 2 is a diagram explaining flow of processing of the data processing device illustrated in FIG. 1.

Flow of processing at the data processing device 10 will be described in detail next. FIG. 2 is a diagram explaining the flow of the processing at the data processing device 10 illustrated in FIG. 1. A case will be described in FIG. 2 where the numbers of appearance of words are obtained as values of elements of a vector.

Learning processing of table data through natural language description will be described first. The data processing device 10 generates a vector in which the numbers of appearance of words in a caption of a row (a side of the table) and the numbers of appearance of words in a caption of a column (a head of the table) are combined for a cell to be processed of table data for learning (see (1) in FIG. 2). Unlike with the method in related art which handles a matrix, the data processing device 10 generates a vector of each cell on the basis of words described at the side of the table and at the head of the table of each cell in this manner. In other words, the data processing device 10 generates a vector of each cell from words appearing in a sentence or text described in a caption of a row and in a caption of a column of each cell among the table data.

Specifically, the data processing device 10 generates a vector which has the numbers of appearance of words used in captions of a row and a column as values of elements for a cell (for example, a cell C1A) at which the caption of the row of the cell (for example, a row R1) intersects with the column of the cell (for example, a column LA) (see (1) in FIG. 2).

The data processing device 10 then creates the training data 152 from the generated vectors (see (2) in FIG. 2). In this example, combinations of the vectors and match (O) or mismatch (-) are learned using, for example, a machine learning tool liblinear (see (3) in FIG. 2).

Prediction processing of predicting content of the cell of the table data will be described next. The data processing device 10 generates a vector in which the numbers of appearance of words in a caption of a row R3 and in a caption of a column LA of a cell C3A are combined for the cell C3A to be processed among the table data (see (4) in FIG. 2). The data processing device 10 predicts matching content from similar vectors with reference to the training data 152 (see (5) in FIG. 2) and outputs a prediction result (see (6) in FIG. 2).

Application Example 1

A method for predicting whether a sightseeing spot matches or mismatches purposes of a travel from comments on the sightseeing spot through machine learning by applying the data processing method according to the present embodiment will be described. FIG. 3 is a diagram illustrating an example of a table indicating comments on a sightseeing spot, purposes and viewpoints of a travel. FIG. 4 is a table indicating the counted numbers of appearance of words described in the table indicated in FIG. 3.

Specifically, a case will be described where whether a sightseeing spot matches or mismatches a purpose of a travel is predicted through machine learning from a table T1-1 indicated in FIG. 3. The table T1-1 describes comments on the sightseeing spot as captions on the side of the table and describes purposes and viewpoints of a travel as captions on the head of the table. Each cell describes whether the sightseeing spot matches (O) or mismatches (-) the purpose of the travel described in the caption of the column of the cell from comments described in the caption of the row of the cell. Note that while in the table T1-1, assessment is indicated with a binary value of a circle (O) and a hyphen (-), the assessment may be indicated with a number of a score (for example, 1 to 5 in a case of a five-point scale).

First, the vector generation unit 1411 of the learning unit 141 performs learning using this table T1-1 as training data. The vector generation unit 1411 extracts all words appearing in captions of rows and in captions of columns of the table T1-1 using a morphological analysis tool (for example, MeCab). The vector generation unit 1411 then sorts the words, deletes overlapping words, counts the number of appearance of each word and acquires a word list.

As indicated in a table of the counted numbers of appearance of words T1-2 illustrated in FIG. 4, the vector generation unit 1411 arranges the numbers of appearance of respective words appearing in the captions of the rows and the columns of the cells to be processed for each cell. As indicated in the table T1-2, the vector generation unit 1411 extracts "local" as a word 1, "brand" as a word 2, "beef" as a word 3 and "streetscape" as a word n from the captions of respective rows and the captions of the respective columns in the table T1-1.

The vector generation unit 1411 then counts the number of appearance of the word 1 as "1", counts the number of appearance of the word 2 as "1", counts the number of appearance of the word 3 as "1" and counts the number of appearance of the word n as "1" as indicated in a frame F1A of the table T1-2 for the cell C1A of the table T1-1. Note that the vector generation unit 1411 may describe the frequencies of appearance of the words in respective fields of the table T1-2 in place of the numbers of appearance of the words.

The vector generation unit 1411 then sets the numbers of appearance of words appearing in the caption of the row and in the caption of the column of the cell as element values of the vector of the cell at which the row and the column of the table T1-1 intersect with each other. For example, the numbers of appearance of words used in the captions D1 and DA respectively in the row R1 and the column L1 are set as a vector of the cell CIA at which the row R1 and the column LA of the table T1-1 intersect with each other.

FIG. 5 is a diagram illustrating an example of the vectors generated by the learning unit 141 illustrated in FIG. 1. In FIG. 5, the vector of the cell CIA is displayed as a vector 1A. Note that a vector 1B is a vector of a cell C1B at which the row R1 intersects with a column LB.

As illustrated in FIG. 5, the vector generation unit 1411 generates a number sequence of one line as a vector for each of the cells at which the rows and the columns of the table T1-1 respectively intersect with each other. It is assumed that among numbers at the head of each number sequence, "+1" indicates match (O) and "−1" indicates mismatch (-).

Colons (:) are provided between numbers for the second and subsequent numbers of each row. A number on the left side of the colon (:) is a word number (which is an index, and "1" in a case of the word 1, "2" in a case of the word 2, and "n" in a case of the word n). A number on the right side of the colon (:) is the number of appearance of each word.

In a case where the row or the column is to be weighted, the vector generation unit 1411 multiplies the numbers of appearance of words appearing in the caption of the row or the column to be weighted by a weight value and sets the multiplied values as the values of the elements of the vector. For example, in a case where importance is placed on the column and a weight of "2" is applied to all columns, the vector generation unit 1411 adds a value obtained by multiplying the number of times of appearance of each word appearing in the caption of the row by 2, to the number of times of appearance of each word appearing in the caption of the column and sets this value as the number of appearance.

Further, the value of the element of the vector, that is, the number on the right side of the colon (:) may be a value of a frequency of appearance of the word. In this case, the vector generation unit 1411 calculates a value of the frequency of appearance by dividing the number of appearance of each word by the total number of appearance of words to be vectorized, which is acquired as the word list.

The learning processing unit 1412 then causes learning to be performed using a machine learning tool (for example, liblinear) using the vectors generated as illustrated in FIG. 5 as training data. The learning processing unit 1412 obtains a result of machine learning, that is, tendency as to which of two groups of match (+1) and mismatch (−1) indicated at the head, arrangement of numbers of each row except the number at the head is classified. In other words, the learning processing unit 1412 performs supervised machine learning which provides learning of arrangement of numbers including a number indicating match (+1) at the head and arrangement of numbers including a number indicating mismatch (−1) at the head.

The prediction unit 142 performs prediction processing of predicting match (+1) or mismatch (−1) using the learning result 153 of machine learning obtained through processing by the learning unit 141. For example, the prediction unit 142 selects one item of comments on the sightseeing spot which is not used in machine learning from the table T1-1. Note that while the prediction unit 142 may select a plurality of items, to simplify the description, a case will be assumed where the prediction unit 142 selects one item, and the item will be referred to as a cell D11 for prediction.

The vector generation unit 1421 of the prediction unit 142 obtains the numbers of appearance of words in a caption of a row and in a caption of a column of the cell D11 in a similar manner to creation of the table indicating the counted numbers of appearance of words indicated in the table T1-2 and sets the obtained numbers of appearance as the values of the elements of the vector. Further, in a case where the row or the column is to be weighted, the vector generation unit 1421 multiplies the numbers of appearance of words appearing in the row or in the column by a weight value and sets the multiplied values as the values of the elements of the vector. FIG. 6 is a diagram illustrating an example of the vectors generated by the prediction unit 142 illustrated in FIG. 1.

In the example of the vectors illustrated in FIG. 6, the number at the head (in this example, "−1") is a temporal value which is to be replaced with a prediction result later. For example, liblinear is used as the machine learning tool. The prediction processing unit 1422 of the prediction unit 142 calculates whether this feature vector is match (+1) or mismatch (−1), and calculates which group of vectors, this feature vector is close to on the basis of the learning result 153 by the learning unit 141.

The prediction processing unit 1422 predicts that the cell D11 matches in a case where the result is "+1". Further, the prediction processing unit 1422 predicts that the cell D11 mismatches in a case where the result is "−1". The prediction processing unit 1422 performs prediction for each of purposes and viewpoints of the travel A, B, C, . . . .

Application Example 2

Figures 8, 9:
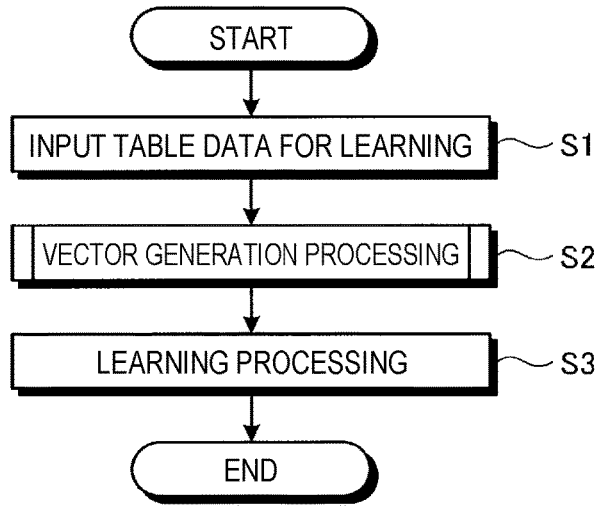
FIG. 8 is a table indicating the counted numbers of appearance of words described in the table indicated in FIG. 7.
FIG. 9 is a diagram illustrating processing procedure of learning processing to be executed by a data processing device 10 in the embodiment.

A method for predicting whether or not verification is required through machine learning by applying the data processing method according to the present embodiment will be described next. FIG. 7 is a diagram illustrating an example of a table indicating whether or not verification is required, which is to be learned. FIG. 8 is a table of the counted numbers of appearance of words described in the table indicated in FIG. 7.

As indicated in a table T2-1 in FIG. 7, in the table indicating whether or not verification is required, description regarding functional requirements of developed functions (functional requirement description) is associated with whether or not verification (test) is required for respective described functions. Each cell of the table T2-1 describes whether verification is required (O) or not required (-).

The vector generation unit 1411 of the learning unit 141 learns this table T2-1 as training data. The vector generation unit 1411 extracts all words appearing in captions of rows and in captions of columns of the table T2-1 using a morphological analysis tool (for example, MeCab). The vector generation unit 1411 then sorts the words, deletes overlapping words, counts the number of appearance of each word and acquires a word list.

The vector generation unit 1411 arranges the frequency of appearance of the respective words for each cell as indicated in a table T2-2 indicating the counted numbers of appearance of words indicated in FIG. 8. The vector generation unit 1411 extracts "traffic" as a word 1, "collection" as a word 2, an "item" as a word 3 and "prevention" as a word n from the captions of the respective rows and the captions of the respective columns of the table T2-1 as indicated in the table T2-2.

The vector generation unit 1411 then counts the number of appearance of the word 1 as "1", counts the number of appearance of the word 2 as "1", counts the number of appearance of the word 3 as "1" and counts the number of appearance of the word n as "0" for a cell C1A' in the table T2-1 as indicated in a frame F1A'. The vector generation unit 1411 then sets the numbers of appearance of words appearing in the caption of the row and in the caption of the column of a cell as elements values of a vector of the cell at which the row and the column of the table T2-1 intersect with each other. For example, the numbers of appearance of words used in the captions D1' and DA' respectively in a row R1' and in a column LA' are set as a vector of a cell C1A' at which the row R1' and the column LA' of the table T2-1 intersect with each other. Note that the subsequent learning processing and prediction processing are similar to those in the application example 1, and thus, description will be omitted.

[Processing Procedure of Learning Processing]

Learning processing to be executed by the data processing device 10 will be described next. FIG. 9 is a diagram illustrating processing procedure of the learning processing to be executed by the data processing device 10 in the embodiment.

As illustrated in FIG. 9, at the data processing device 10, in a case where table data for learning is input to the learning unit 141 (step S1), the vector generation unit 1411 performs vector generation processing of generating a vector for a cell to be processed among the table data for learning (step S2). The learning processing unit 1412 then performs learning processing of learning the vector of the cell generated by the vector generation unit 1411 for the table data for learning and content of the cell for which the vector is generated among cells of the table data for learning, using machine learning (step S3), and stores the learning result 153 in the storage unit 15.

[Processing Procedure of Vector Generation Processing]

Figure 10:
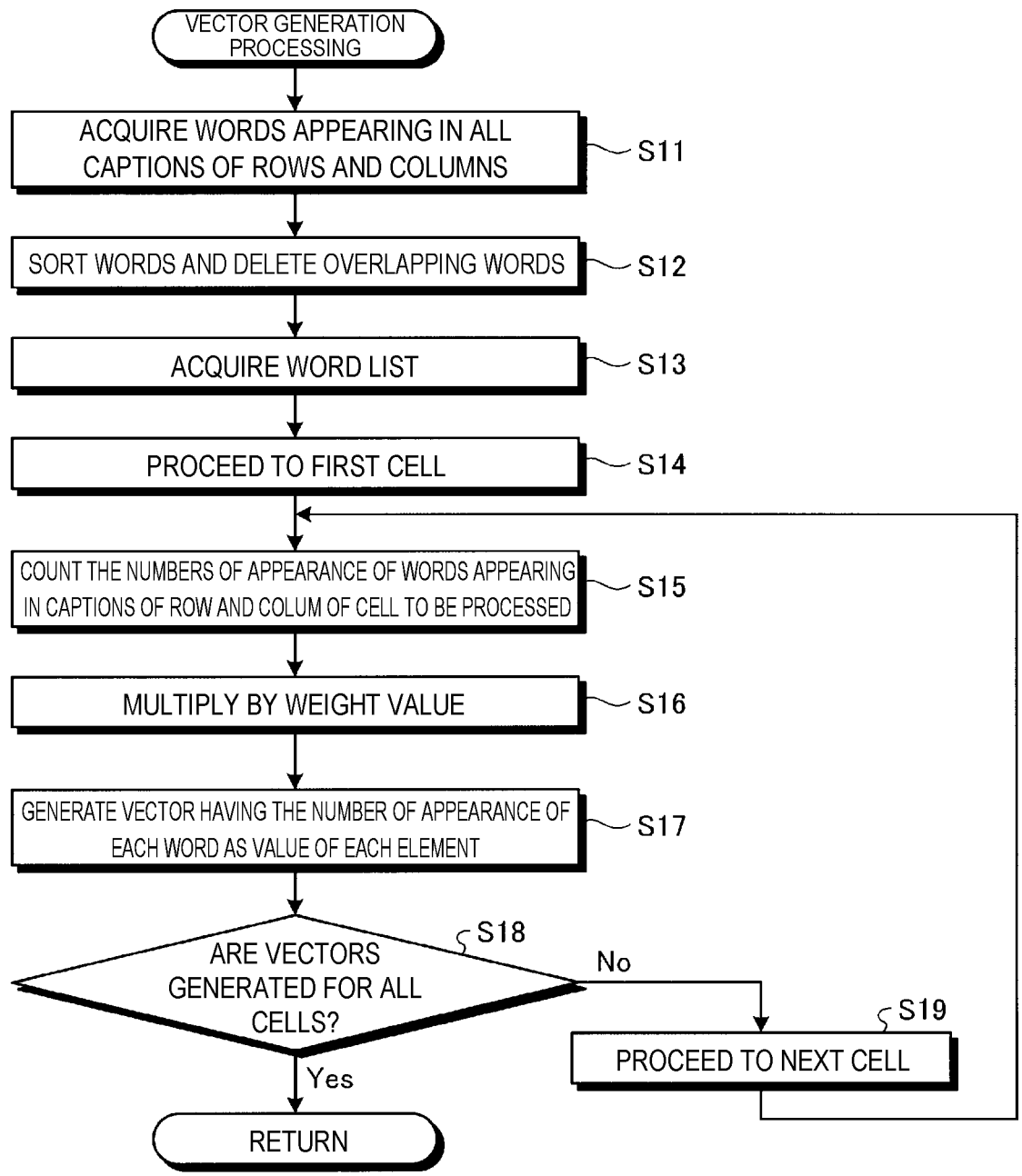
FIG. 10 is a flowchart illustrating processing procedure of vector generation processing illustrated in FIG. 9.

Processing procedure of the vector generation processing (step S2) illustrated in FIG. 9 will be described next. FIG. 10 is a flowchart illustrating the processing procedure of the vector generation processing illustrated in FIG. 9. The vector generation unit 1411 generates a vector corresponding to each cell for each of cells to be learned among the table data for learning.

First, the vector generation unit 1411 acquires all words appearing in captions of rows and in captions of columns of the table data for learning using a morphological analysis tool (step S11). The vector generation unit 1411 then sorts the words, deletes overlapping words (step S12), and then, counts the number of appearance of each word, and acquires a word list (step S13).

Subsequently, the vector generation unit 1411 proceeds to a first cell to be processed in the table data (step S14) and performs processing from the subsequent step S15 to step S18. Specifically, the vector generation unit 1411 counts the numbers of appearance of words appearing in a caption of a row and in a caption of a column of a cell to be processed (step S15). In a case where the row or the column of this cell is to be weighted, the vector generation unit 1411 multiplies the numbers of appearance of words appearing in the caption of the row or in the caption of the column which is to be weighted by a weight value (step S16).

The vector generation unit 1411 then generates a vector which has the numbers of appearance of respective words or values obtained by multiplying the numbers of appearance of respective words by a weight value as values of respective elements, as a vector of the cell to be processed (step S17).

The vector generation unit 1411 determines whether or not vectors are generated for all the cells to be processed (step S18). In a case where vectors are not generated for all the cells to be processed (step S18: No), the vector generation unit 1411 proceeds to the next cell to be processed (step S19) and performs processing from step S15 to step S18.

Meanwhile, in a case where vectors are generated for all the cells to be processed (step S18: Yes), the vector generation unit 1411 outputs the vectors generated for the respective cells to the subsequent processing unit. In a case of vector generation processing by the learning unit 141, the vector generation unit 1411 outputs the vectors of the respective cells to the learning processing unit 1412.

[Processing Procedure of Prediction Processing]

Figure 11:
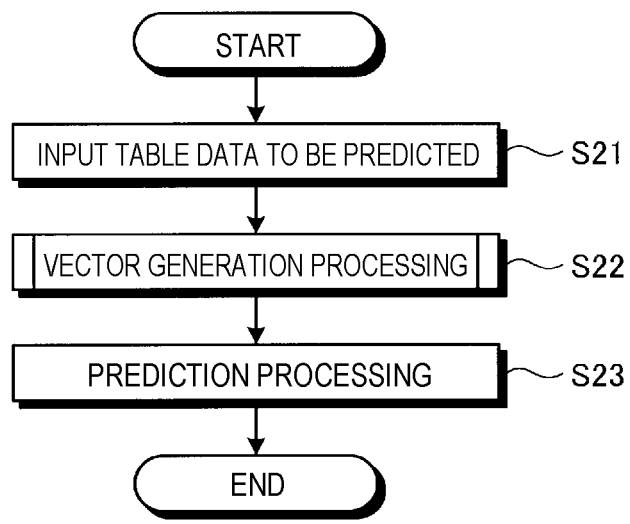
FIG. 11 is a diagram illustrating processing procedure of prediction processing in the embodiment.

Prediction processing to be executed by the data processing device 10 will be described next. FIG. 11 is a diagram illustrating the processing procedure of the prediction processing in the embodiment.

As illustrated in FIG. 11, at the data processing device 10, in a case where table data to be predicted is input to the prediction unit 142 (step S21), the vector generation unit 1421 performs vector generation processing of generating vectors for cells to be processed among the table data to be predicted (step S22). The vector generation unit 1421 performs the same processing as the processing from step S11 to step S19 in FIG. 10 on the cells of the table data to be predicted and executes the vector generation processing (step S22).

The prediction processing unit 1422 then performs prediction processing of predicting content of the cells on the basis of the vectors generated by the vector generation unit 1421 and the learning result 153 by the learning unit 141 (step S23).

[Other Processing Procedure of Vector Generation Processing]

Figure 12:
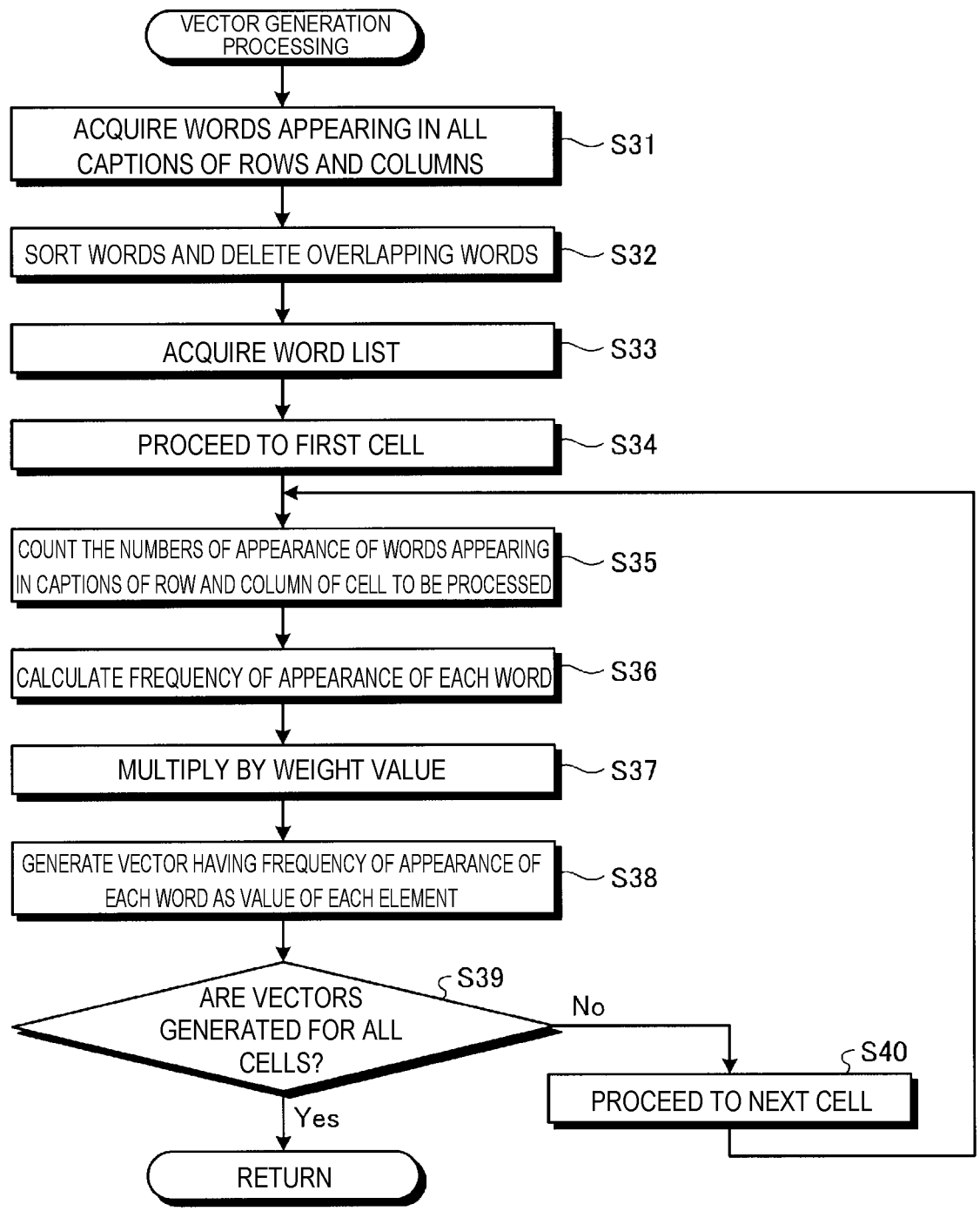
FIG. 12 is a flowchart illustrating another processing procedure of the vector generation processing illustrated in FIG. 9.

Another processing procedure of the vector generation processing (step S2) illustrated in FIG. 9 will be described next. FIG. 12 is a flowchart illustrating another processing procedure of the vector generation processing illustrated in FIG. 9. In the example illustrated in FIG. 12, processing of obtaining frequencies of appearance of words as values of elements of a vector will be described.

Processing from step S31 to step S35 illustrated in FIG. 12 is the same as the processing from step S11 to step S15 indicated in step S10. The vector generation unit 1411 calculates a value of a frequency of appearance by dividing the number of appearance of each word by the total number of appearance of words to be vectorized, which is acquired as the word list (step S36).

In a case where the row or the column of this cell is to be weighted, the vector generation unit 1411 multiplies the frequencies of appearance of words appearing in a caption of the row or in a caption of the column to be weighted by a weight value (step S37). Processing from step S38 to step S40 illustrated in FIG. 12 is the same as the processing from step S17 to step S19 illustrated in FIG. 10.

Effects of Embodiment

In this manner, the data processing device 10 according to the present embodiment 1 obtains the numbers of appearance or frequencies of appearance of words used in a caption of a row and in a caption of a column of a cell at which the row and the column of table data intersect with each other and generates a vector which has the obtained numbers of appearance or the obtained frequencies of appearance as values of elements, as a vector indicating features of the cell. Thus, the data processing device 10 enables vectorization of natural language description in table data which is indicated using a table and which includes captions of respective rows and respective columns.

Thus, according to the data processing device 10, it is possible to vectorize natural language description in cells of table data which is indicated using a table and which includes captions of respective rows and respective columns, so that it is possible to implement machine learning and prediction processing on the table data.

[System Configuration, or the Like]

Illustrated respective components of respective devices are conceptual functional components, and do not necessarily require to be physically constituted as illustrated. In other words, specific forms of distribution and integration of respective devices are not limited to that illustrated and, all or part of the devices may be functionally or physically distributed or integrated in an arbitrary unit in accordance with various kinds of loads, statuses of use, or the like. Further, all or any part of respective processing functions implemented at the respective devices can be implemented at a CPU and with programs which are parsed and executed at the CPU or can be implemented as hardware by wired logic.

Further, among respective kinds of processing described in the present embodiment, all or part of processing which is described as being automatically performed can be also manually performed or all or part of processing which is described as being manually performed can be also automatically performed using a known method. Further, information including the processing procedure, control procedure, specific name, various kinds of data and parameters described above and illustrated in the drawings can be arbitrarily changed unless otherwise specified.

[Program]

Figure 13:
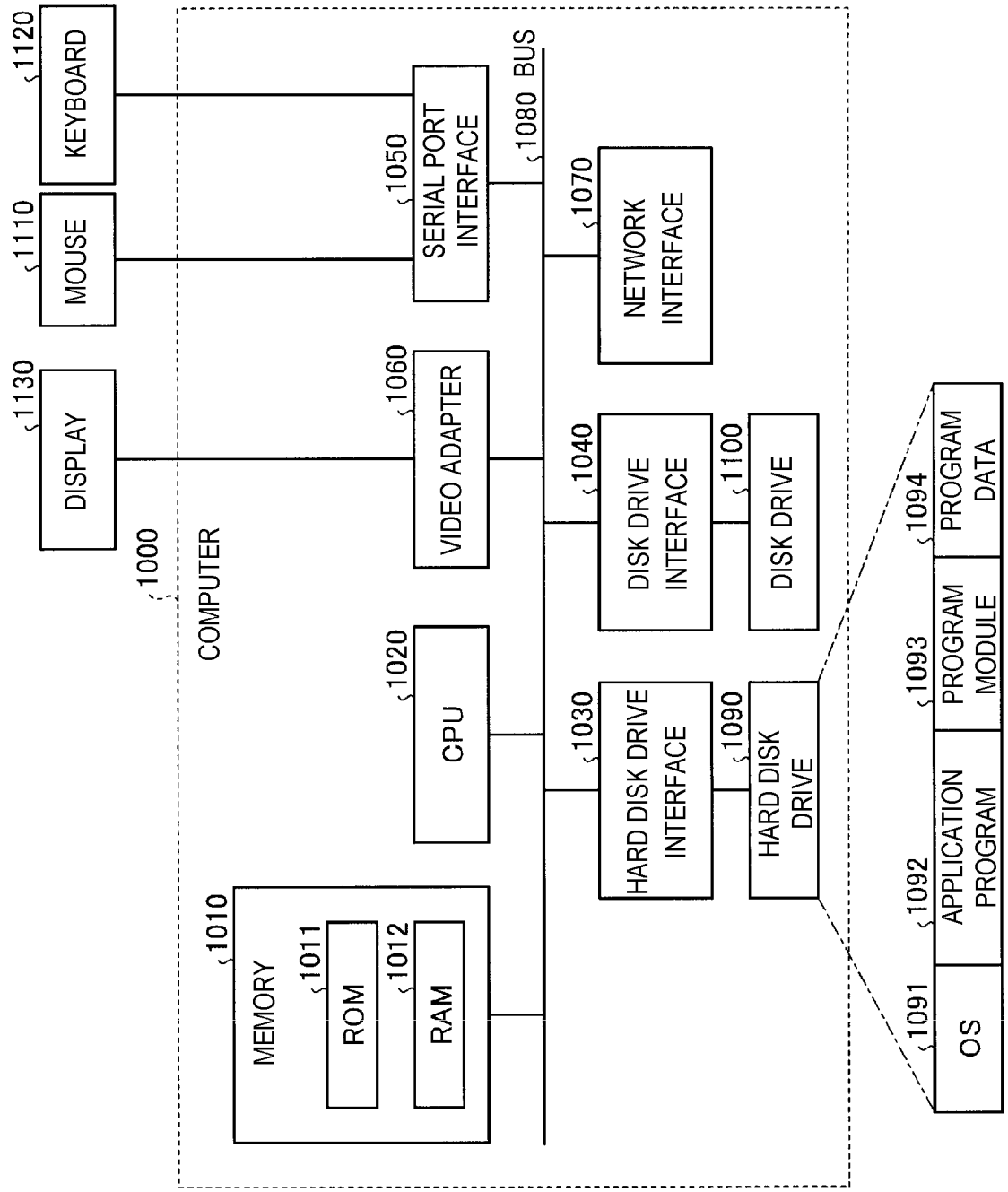
FIG. 13 is a diagram illustrating an example of a computer which implements the data processing device by programs being executed.
Figure 14:
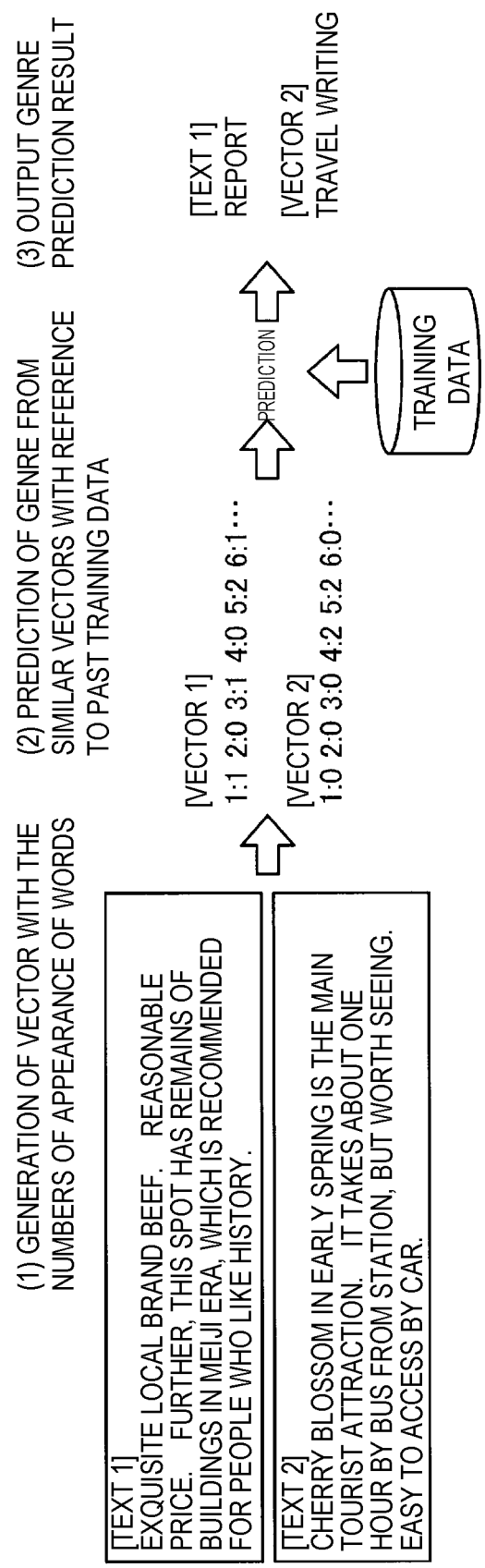
FIG. 14 is a diagram explaining a text genre prediction method using a BoW method in related art.

FIG. 13 is a diagram illustrating an example of a computer which implements the data processing device 10 by programs being executed. A computer 1000 includes, for example, a memory 1010, and a CPU 1020. Further, the computer 1000 includes a hard disk drive interface 1030, a disk drive interface 1040, a serial port interface 1050, a video adapter 1060, and a network interface 1070. These respective components are connected with a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. A detachable storage medium such as, for example, a magnetic disk and an optical disk is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an operating system (OS) 1091, an application program 1092, a program module 1093, and program data 1094. In other words, programs which specify respective kinds of processing of the data processing device 10 are implemented as the program module 1093 which describes codes which can be executed by the computer. The program module 1093 is stored in, for example, the hard disk drive 1090. For example, the program module 1093 for executing processing similar to that of functional components at the data processing device 10 is stored in the hard disk drive 1090. Note that a solid state drive (SSD) may be substituted for the hard disk drive 1090.

Further, configuration data used in the processing in the above-described embodiment is stored in, for example, the memory 1010 and the hard disk drive 1090 as the program data 1094. Then, the CPU 1020 reads out the program module 1093 and the program data 1094 stored in the memory 1010 and the hard disk drive 1090 to the RAM 1012 as necessary and executes the program module 1093 and the program data 1094.

Note that the program module 1093 and the program data 1094 may be stored in, for example, a detachable storage medium and may be read out by the CPU 1020 via the disk drive 1100, or the like, as well as being stored in the hard disk drive 1090. Alternatively, the program module 1093 and the program data 1094 may be stored in other computers connected via a network (such as a local area network (LAN) and a wide area network (WAN)). Further, the program module 1093 and the program data 1094 may be read out from other computers by the CPU 1020 via the network interface 1070.

The embodiment to which the invention made by the present inventor is applied has been described above. However, the present invention is not limited by the description and the drawings in the embodiment which are part of disclosure of the present invention. All other embodiments, examples, operation techniques, and the like, made by a person skilled in the art on the basis of the present embodiment are incorporated into the scope of the present invention.

REFERENCE SIGNS LIST

10 Data processing device
11 Input unit
12 Communication unit
13 Output unit
14 Control unit
15 Storage unit
141 Learning unit
142 Prediction unit
151 Table data
152 Training data
153 Learning result
1411, 1421 Vector generation unit
1412 Learning processing unit
1422 Prediction processing unit

The invention claimed is:

1. A data processing device comprising:
a computer, configured to:
obtain, for a first cell in a first table, a frequency of appearance of words used in a caption of a row and in a caption of a column wherein the row and the column of the first table intersect with each other at the first cell, each of the caption of the row for the first cell and the caption of the column of first cell include a plurality of words;
wherein the data processing device sorts the words in the caption of the row and the caption of the column at which the row and the column of the table intersect with each other at the first cell, and deletes one or more overlapping words among the sorted words before obtaining the frequency of appearance of words for the first cell;
generate a first vector for the first cell that includes the obtained frequency of appearance of words used in the caption of a row and in the caption of the column as a value of an element, and
store the first vector for the first cell and match content corresponding to the first cell as training data;
generate a second vector for a second cell of a second table wherein the second vector includes a frequency of appearance of words in a caption of a row and in a caption of a column for the second cell at which the row and the column of the second table intersect with each other at the second cell;

predict match content corresponding to the second cell based on a result of comparing the first vector, the second vector, and the stored match content;

display the predicted match content corresponding to the second cell based on the result.

2. The data processing device according to claim 1, wherein the data processing device is configured to:
multiply the frequency of appearance of words for the first cell by a weight value corresponding to the row of the first cell or the column of the first cell and
set the multiplied value as a value of an element of the first vector.

3. A data processing method to be executed by a data processing device, including a computer, the data processing method comprising:
obtain, for a first cell in a first table, a frequency of appearance of words used in a caption of a row and in a caption of a column wherein the row and the column of the first table intersect with each other at the first cell, each of the caption of the row for the first cell and the caption of the column of first cell include a plurality of words;
wherein the data processing method sorts the words in the caption of the row and the caption of the column at which the row and the column of the table intersect with each other at the first cell, and deletes one or more overlapping words among the sorted words before obtaining the frequency of appearance of words for the first cell;
generate a first vector for the first cell that includes the obtained frequency of appearance of words used in the caption of a row and in the caption of the column as a value of an element, and
store the first vector for the first cell and match content corresponding to the first cell as training data;
generate a second vector for a second cell of a second table wherein the second vector includes a frequency of appearance of words in a caption of a row and in a caption of a column for the second cell at which the row and the column of the second table intersect with each other at the second cell;
predict match content corresponding to the second cell based on a result of comparing the first vector, the second vector, and the stored match content;
display the predicted match content corresponding to the second cell based on the result.

4. The data processing method according to claim 3, further comprising:

Multiplying the frequency of appearance by a weight value corresponding to the row of the first cell or the column of the first cell; and setting the multiplied value as a value of an element of the first vector.

5. A non-transitory recording medium storing a data processing program, wherein execution of the data processing program causes a computer to perform operations comprising:
obtaining, for a first cell in a first table, a frequency of appearance of words used in a caption of a row and in a caption of a column wherein the row and the column of the first table intersect with each other at the first cell, each of the caption of the row for the first cell and the caption of the column of first cell include a plurality of words;
wherein the data processing program sorts the words in the caption of the row and the caption of the column at which the row and the column of the table intersect with each other at the first cell, and deletes one or more overlapping words among the sorted words before obtaining the frequency of appearance of words for the first cell;
generating a first vector for the first cell that includes the obtained frequency of appearance of words used in the caption of a row and in the caption of the column as a value of an element, and
store the first vector for the first cell and match content corresponding to the first cell as training data;
generating a second vector for a second cell of a second table wherein the second vector includes a frequency of appearance of words in a caption of a row and in a caption of a column for the second cell at which the row and the column of the second table intersect with each other at the second cell;
predicting match content corresponding to the second cell based on a result of comparing the first vector, the second vector, and the stored match content;
display the predicted match content corresponding to the second cell based on the result.

6. The non-transitory recording medium according to claim 5, wherein the operations further comprise:
Multiplying the frequency of appearance by a weight value corresponding to the row of the first cell or the column of the first cell; and
Setting the multiplied value as a value of an element of the first vector.

* * * * *